(12) United States Patent
Lindh et al.

(10) Patent No.: US 11,851,372 B2
(45) Date of Patent: Dec. 26, 2023

(54) RADIATION-TREATED FIBERS, METHODS OF TREATING AND APPLICATIONS FOR USE

(71) Applicant: FORTA, LLC, Grove City, PA (US)

(72) Inventors: Rodger B. Lindh, Grove City, PA (US); John B. Lindh, Carnegie, PA (US); Christopher P. Lovett, Harrisville, PA (US); Martin Doody, Grove City, PA (US)

(73) Assignee: FORTA, LLC, Grove City, PA (US)

( * ) Notice: Subject to any disclaimer, the term of this patent is extended or adjusted under 35 U.S.C. 154(b) by 0 days.

(21) Appl. No.: 17/960,907

(22) Filed: Oct. 6, 2022

(65) Prior Publication Data

US 2023/0107019 A1 Apr. 6, 2023

Related U.S. Application Data

(62) Division of application No. 16/701,368, filed on Dec. 3, 2019, now Pat. No. 11,492,292.

(60) Provisional application No. 62/774,422, filed on Dec. 3, 2018.

(51) Int. Cl.
| | |
|---|---|
| C08F 2/46 | (2006.01) |
| C08F 2/50 | (2006.01) |
| C08G 61/04 | (2006.01) |
| C04B 20/02 | (2006.01) |
| C04B 16/06 | (2006.01) |
| C04B 26/26 | (2006.01) |
| C04B 28/00 | (2006.01) |
| C04B 28/04 | (2006.01) |
| C04B 111/70 | (2006.01) |

(52) U.S. Cl.
CPC ........ *C04B 20/023* (2013.01); *C04B 16/0633* (2013.01); *C04B 26/26* (2013.01); *C04B 28/001* (2013.01); *C04B 28/04* (2013.01); *C04B 2111/70* (2013.01)

(58) Field of Classification Search
CPC ..... C04B 20/023; C04B 28/02; C04B 28/001; C04B 26/26; C04B 16/0633; C04B 16/0625; C04B 16/0691; C04B 2111/00715; C04B 2111/70
USPC ....... 522/157, 150, 1, 6, 189, 184, 71; 520/1
See application file for complete search history.

(56) References Cited

U.S. PATENT DOCUMENTS

| | | | |
|---|---|---|---|
| 6,057,033 A | 5/2000 | Bilodeau | |
| 6,514,449 B1 | 2/2003 | Paulauskas et al. | |
| 6,800,670 B2 | 10/2004 | Shen et al. | |
| 7,484,949 B2 | 2/2009 | Hinc et al. | |
| 7,754,320 B2 | 7/2010 | Lyons et al. | |
| 9,688,536 B2 | 6/2017 | Zhang et al. | |
| 2007/0110977 A1 | 5/2007 | Al-Haik et al. | |
| 2007/0251572 A1 | 11/2007 | Hoya et al. | |
| 2008/0299389 A1 | 12/2008 | Kawakami et al. | |
| 2014/0275350 A1 | 9/2014 | Lovett et al. | |
| 2017/0275430 A1 | 9/2017 | Kube et al. | |

FOREIGN PATENT DOCUMENTS

| | | | | |
|---|---|---|---|---|
| CN | 101516800 A | 8/2009 | | |
| EP | 1580173 A1 | 9/2005 | | |
| FR | 2999567 A1 | 6/2014 | | |
| WO | 2005027988 A2 | 3/2005 | | |
| WO | 2014144575 A1 | 9/2014 | | |
| WO | WO-2014144575 A1 * | 9/2014 | ......... | C04B 20/1033 |
| WO | 2015084720 A1 | 6/2015 | | |
| WO | WO-2017153206 A1 * | 9/2017 | ............. | H03G 5/165 |

OTHER PUBLICATIONS

Shubhra et al, Effect of gamma radiation on the mechanical properties of natural silk fiber and synthetic E-glass fiber reinforced polypropylene composites: A comparative study, May 4, 2011, Radiation and physics and chemistry, 80, 1228-1232 (Year: 2011).*
Extended European Search Report Issued in EP Patent Application No. 19893953.0, dated Jul. 20, 2022.
International Search Report and Written Opinion dated Feb. 18, 2020, in International Patent Application No. PCT/US2019/064149.
Shubhra et al., Effect of Gamma Radiation on the Mechanical Properties of Natural Silk Fiber and Synthetic E-Glass Fiber Reinforced Polypropylene Composites: a Comparative Study, Radiation Physics and Chemistry (Nov. 2011), 80(11):1228-1232.
Quikrete, Portland Cement Based Grouts, Quikrete Cement and Concrete Products (May 8, 2012).
Marais, Thermo-Mechanical Performances of Polyethylene Fibres/ Polyethylene Matrix Composites, Developments in the Science and Technology of Composite Materials (1990), 1057-1065.

* cited by examiner

*Primary Examiner* — Jessica Whiteley

(74) *Attorney, Agent, or Firm* — Carol A. Marmo; Eckert Seamans Cherin & 2.Mellott. LLC

(57) ABSTRACT

The invention relates to radiation-treated reinforcement fibers, reinforced asphalt and portland cement concrete, and grout, methods for producing the same and application for their use. The radiation treatment includes exposing reinforcement fibers to electromagnetic energy, e.g., gamma rays, and/or electron-beam (E-beam) radiation. As a result of the treatment, the radiation-treated reinforcement fibers have a modified or deformed surface, e.g., an abraded and/or porous surface, as compared to reinforcement fibers without a radiation treatment.

4 Claims, No Drawings

RADIATION-TREATED FIBERS, METHODS OF TREATING AND APPLICATIONS FOR USE

CROSS-REFERENCE TO RELATED APPLICATIONS

This application is a divisional of, and claims benefit of priority to, U.S. patent application Ser. No. 16/701,368, entitled "RADIATION-TREATED FIBERS, METHODS OF TREATING AND APPLICATIONS FOR USE", filed on Dec. 3, 2019, which claims priority from United States Provisional Patent Application Ser. No. 62/774,422, entitled "RADIATION-TREATED FIBERS, METHODS OF TREATING AND APPLICATIONS FOR USE", filed on Dec. 3, 2018, the disclosures of which are incorporated herein by reference.

FIELD OF THE INVENTION

This invention relates to treated reinforcement fibers, methods for treating the reinforcement fibers, and applications for use of the treated reinforcement fibers. The invention, more particularly, includes exposing reinforcement fibers to electromagnetic energy, e.g., gamma rays, and/or electron-beam radiation to form radiation-treated reinforcement fibers and, employing the radiation-treated reinforcement fibers in asphalt and portland cement concrete materials, as well as grout. The radiation-treated reinforcement fibers provide advantages as compared to non-radiation-treated reinforcement fibers including, but not limited to, one or more of improved strength, toughness, durability, bonding and performance in concrete and grout.

BACKGROUND OF THE INVENTION

Reinforcement components, such as fibers, are generally known in the art. Further, addition of these reinforcement components to building materials, such as concrete, including asphalt and portland cement concrete and the like, is known to add strength, toughness, and durability to improve the integrity of the material properties of the concrete. For example, a reinforcement component is typically added to concrete to reduce the effect of two main structural deficiencies: 1) low tensile strength and 2) low strain at fracture. The tensile strength of concrete is relatively low because concrete, when formed, normally contains numerous micro-cracks. It is the rapid propagation of these micro-cracks under applied stress that is responsible for the low tensile strength of the material.

Reinforcement components, such as fibers, are also generally known in the art for use in grout materials. There are varied uses for grout known in the art, such as, to embed rebars in masonry walls, connect sections of precast concrete, and fill voids and seal joints, such as between tiles. Structural grout is often used in reinforced masonry to fill voids in masonry housing reinforcing steel, securing the steel in place and bonding it to the masonry. Non-shrink grout is used beneath metal bearing plates to ensure a consistent bearing surface between the plate and its substrate. Grout compositions are also used to anchor bolts for various structures into a variety of substrates. For example, grout is used to anchor power line tower support bolts and guy wires to the earth. Grout compositions are additionally used in micro-piles in the earth that consist of holes in the range of from 15 to 80 feet in depth. The hardened piles then serve as support connections for electrical transmission line structures. In these applications, the grout composition is often in the form of a liquid. The liquid grout is used to fill hollow cavities or holes. With known grout compositions, leakage through porous and fractured rock within the earthen substrate has occurred. As a result, a significant portion of the grout used to fill the cavities can be lost. Since considerably more grout needs to be used than estimated, the cost associated with the grout leakage and losses can be significant. Thus, there is a need in the art to improve grout compositions such that they remain flowable during insertion and placement, and then thicken in order to reduce or preclude losses due to leakage into undesired zones. In general, it is desirable to form a grout composition that is thixotropic in nature such that the grout flows readily when in a liquid form, is transformed to a gel when static and subsequently returns to a liquid when forced to move. Further, it is advantageous for the grout composition to plug-off cavities to prevent leakage there through.

Known reinforcement fibers include, for example, asbestos fibers, glass fibers, steel fibers, mineral fibers, natural fibers, synthetic fibers (such as polymer and aramid fibers), and cellulose fibers. Some reinforcement fibers are better suited for particular applications than others. There are various disadvantages associated with these known reinforcement fibers. For example, they generally do not exhibit good adhesion to concrete. Exposure of these reinforcement fibers to various environmental conditions, such as alkaline media, can cause the reinforcement fibers to degrade. Some advances have been made in the area of reinforcement fibers to provide improved adhesion. For example, additive solutions can be added to fiber/concrete mixtures to improve adhesion. However, even with the additive solutions, reinforcement fibers still have disadvantages that weaken or, otherwise, limit their effectiveness.

High-energy ionizing radiation, such as gamma rays (electromagnetic energy) is used to modify the physical and chemical properties of polymeric materials. Radiation initiates reactions at any temperature, including room temperature, under any pressure, in any phase, whether solid, liquid or gas, without the use of catalysts. This type of radiation promotes ionization and excitation in the irradiated material to produce free radicals that are highly reactive species. Ionization and excitation in the materials tend to react with neighboring atoms, eventually causing cross-linking or scission of the polymer chains.

Accordingly, there is a need for reinforcement fibers that impart improved properties to the materials to which they are added and, in particular, the need exists for reinforcement fibers being modified such that when radiation-treated reinforcement fibers are added to concrete materials, the result is one or more of improved strength, toughness, durability, and adhesion, e.g., bonding, between the fibers and the concrete, as compared to non-radiation-treated reinforcement fibers known in the art. Furthermore, there is a need for the addition of radiation-treated reinforcement fibers in grout materials.

SUMMARY OF THE INVENTION

In one aspect, the invention provides radiation-treated reinforcement fibers, which include reinforcement fibers having a surface, and a modification to the surface formed by exposure to electromagnetic energy and/or electron-beam (E-beam) radiation. In certain embodiments, the electromagnetic energy includes gamma radiation, e.g., gamma rays. The resultant radiation-treated fibers provide at least one of improved bonding with asphalt and portland cement concrete compositions, and improved surface modification, e.g., from a smooth surface to a rough or an abraded surface or a surface having an asperity or a deformation or pores, as compared to reinforcement fibers without exposure to, or absorption of, the electromagnetic energy or electron-beam radiation.

In another aspect, the invention provides radiation-treated reinforcement fibers as described above, which impart improved properties in grout compositions as compared to reinforcement fibers without exposure to, or absorption of, the electromagnetic energy or electron-beam radiation.

In another aspect, the invention provides a method of treating reinforcement fibers to produce radiation-treated reinforcement fibers. The method includes obtaining reinforcement fibers having a surface and a modification to the surface formed by exposure to a source of electromagnetic energy, e.g., gamma radiation, or electronic-beam radiation; and forming the radiation-treated reinforcement fibers having a modified or deformed surface as compared to reinforcement fibers without a radiation treatment.

In another aspect, the invention provides reinforced asphalt and portland cement concrete compositions. The compositions include a plurality of radiation-treated reinforcement fibers each having a surface and a modification to the surface formed by exposure to electromagnetic energy or electronic-beam radiation, aggregate, and binder. The radiation-treated reinforcement fibers include a rough or an abraded surface that contributes to improved bonding within the asphalt and portland cement concrete compositions.

In another aspect, the invention provides a method of reinforcing asphalt and portland cement concrete. The method includes providing reinforcement fibers having a surface; exposing the surface to electromagnetic energy, e.g., gamma radiation, or electronic-beam radiation; producing radiation-treated reinforcement fibers; and adding said radiation-treated reinforcement fibers to the asphalt and portland cement concrete.

In another aspect, the invention provides grout compositions including a plurality of radiation-treated reinforcement fibers, each having a surface and a modification to the surface formed by exposure to electromagnetic energy or electron-beam radiation, and a dry grout material or blend.

In another aspect, the invention provides a method of preparing grout that includes providing reinforcement fibers having a surface; exposing the surface to electromagnetic energy, e.g., gamma radiation, or electron-beam radiation; producing radiation-treated reinforcement fibers; and adding said radiation-treated reinforcement fibers to the grout. In certain embodiments, the grout may be a dry material or blend selected from cement, bentonite clay and mixtures thereof.

DETAILED DESCRIPTION OF THE INVENTION

The invention relates to radiation-treated reinforcement fibers, methods for preparing the radiation-treated reinforcement fibers, use of a radiation treatment to produce surface-modified or deformed reinforcement fibers, and incorporation of the treated, e.g., surface-modified or deformed, reinforcement fibers to produce reinforced concrete and grout.

The term "concrete" as used herein and the claims means asphalt and portland cement concrete and the like.

The radiation treatment is administered by exposing reinforcement fibers to a source of electromagnetic energy, e.g., gamma radiation, or a source of electron-beam (E-beam) radiation.

The difference between various forms of electromagnetic energy is the wavelength. X-rays and gamma rays have short wavelengths. Electronic-beam (electron accelerator) radiation uses a beam of electrons. In general, gamma radiation and electron-beam sources, and conventional mechanisms and techniques for exposing materials to these sources, are known in the art.

In the invention, the surface of reinforcement fibers is exposed to radiation generated by a radiation source using various conventional mechanisms and techniques known in the art. As a result of exposure to gamma radiation and/or electron-beam radiation, and/or absorption of radiation energy, the microstructure of the radiation-treated reinforcement fibers is changed or modified.

For example, the surface of the radiation-treated fibers is different as compared to reinforcement fibers not exposed to radiation. The reinforcement fibers not exposed to radiation typically have a surface that is smooth, e.g., glass-like. In contrast, the radiation-treated reinforcement fibers have a surface that is rough or abraded, or has deformations or asperities. Without intending to be bound by any particular theory, it is believed that the modified or microscopically deformed surface, e.g., rough, abraded or with asperities, contributes to improved bonding of the radiation-treated reinforcement fibers with asphalt or cement concrete, or a grout composition. In addition, it has been found that as a result of exposure to gamma radiation, and/or absorption thereof, the surface of the radiation-treated reinforcement fibers is porous. It is believed that the plurality of pores in the surface contributes to improved bonding of the radiation-treated reinforcement fibers with asphalt or cement concrete, or a grout composition, by allowing portions of the cementitious or grout material to be embedded within the plurality of pores. Moreover, the microscopic modifications, e.g., deformations and pores, increase the surface area that is available for mechanically bonding between cement or asphalt molecules and the radiation-treated fibers. This increase of bondable area improves the ability of the radiation-treated fibers to anchor in the concrete, thereby increasing the flexural strength of the concrete. The increased area of bondability also improves the pull-out results of the radiation-treated fibers in concrete versus non-irradiated fibers (i.e., without radiation treatment) in concrete.

It has been found that the radiation-treated reinforcement fibers have a modulus that is about 20% higher than the modulus of reinforcement fibers without radiation treatment. Further, radiation-treated reinforcement fibers also have a tensile strength that is higher than the tensile strength demonstrated by reinforcement fibers without radiation treatment, and the surface area of the radiation-treated reinforcement fibers is greater than the surface area of the reinforcement fibers without radiation treatment.

The use of radiation-treated reinforcement fibers provides at least one of the following desirable changes to the asphalt and portland cement concrete when it is field placed and set: increased strength, increased durability, increased toughness, and reduced or minimal formation of cracks over time. Furthermore, the use of radiation-treated reinforcement fibers in accordance with this invention results in improved adhesion, e.g., bonding, between the treated reinforcement fibers and the asphalt and portland cement concrete, as compared to the use of non-radiation-treated reinforcement fibers.

There is a wide variety of reinforcement fibers known in the art that are suitable for use in the invention. Generally, reinforcement fibers include multiple strands of monofilaments. Suitable reinforcement fibers for use in the invention include monofilament and fibrillated, synthetic and natural fibers. Natural fibers include wood-derivative fibers and mixtures thereof. Synthetic fibers include, but are not limited to, polymer fibers, aramid fibers and mixtures thereof. Polymer fibers include, but are not limited to, polyolefin fibers such as polypropylene fibers and polyethylene fibers, polyamide fibers such as nylon fibers, polyvinyl-chloride fibers, polyester fibers, and mixtures thereof. In addition, carbon and basalt fibers are suitable for use in the invention. In certain embodiments of the invention, the reinforcement fibers include only aramid fibers, only polyolefin fibers, only nylon fibers, or a blend of two or more of aramid fibers, polyolefin fibers and nylon fibers, such as a blend of aramid fibers and polyethylene fibers and/or polypropylene fibers.

The reinforcement fibers include various shapes, sizes, and forms. In certain embodiments, the reinforcement fibers are flat such as in the form of a sheet, or cylindrical such as in the form of a tube or cord. In certain embodiments, the reinforcement fibers include one or more crimps, in the flat or cylindrical length of the fiber. The crimp(s) form a fiber having different shapes such as z-shaped, s-shaped, w-shaped and wedge-shaped fibers. In certain embodiments, loose fibers are difficult to handle and therefore, the reinforced fibers are configured and controlled, e.g., grouped or bundled together, to improve the ease of handling, e.g., for adding the fibers to a concrete mixing process. For example, the tubes or cords are bundled together in a circumferential wrap and cut to a predetermined length using conventional techniques and methods known for cutting fibers. A suitable length for the fibers varies widely, and the length is selected such that the fibers are dispersible in a concrete mixture. In non-limiting embodiments, the fibers are cut into a length within the range of about 19 to 60 mm.

The fibers, individually or together in various configurations and proportions, are fibrillated (i.e., pulled apart to form a net like structure) or non-fibrillated, and/or in a predetermined number of twists and turns. For example, the fibers suitable for use in the invention include a fiber component, as disclosed in U.S. Pat. No. 7,168,232 ("the '232 patent"). In certain embodiments, the fiber component is a twisted bundle of multiple strands of a non-fibrillating monofilament. The '232 patent further discloses the twisted fiber component with another fiber component, discrete from the twisted fiber component, that is fibrillated. In U.S. Pat. No. 4,346,135, a fibrous reinforcing means, including at least two various groups of fibrous articles, is disclosed. At least one of the groups includes fibrous articles in the form of a closed filamentary net. In U.S. Pat. No. 6,753,081, a synthetic fiber blend is disclosed. The synthetic fiber blend includes a first fiber component formed of a homopolymer polypropylene fiber, and a second fiber component is a copolymer formed of a polypropylene and a high-density polyethylene. The disclosures of U.S. Pat. Nos. 7,168,232; 6,753,081; and 4,346,135 are incorporated herein by reference.

The amount of energy provided by radiation and/or duration of radiation exposure of the reinforcement fibers varies, and depends on one or more of the selected fiber material, exposure source and method, and the desired properties of the resulting radiation treated fibers. According to the invention, the reinforcement fibers are treated with varying amounts or doses of radiation energy. In certain embodiments, the reinforcement fibers are treated with 5 kGy to 70 kGy or from 5 kGy to less than 70 kGy, or from 5 kGy to 35 kGy or from 5 kGy to less than 35 kGy, or from 35 to 70 kGy or from 35 to less than 70 kGy. In alternate embodiments, the reinforcement fibers are treated with 5 kGy, or 35 kGy, or 70 kGy.

Polymer fibers have poor interfacial bond strength and bonding characteristics that limit their performance with cementitious material. Surface modification or deformation of fibers due to gamma radiation exposure and/or absorption affects the fiber matrix bond. Modifications or deformations caused by gamma radiation in the physiochemical properties of polymer depend on several parameters such as the amount of absorbed energy per unit mass, administered amount or dose of radiation, irradiation conditions including type of gas (e.g., air, $N_2$ or the like), and irradiation temperature.

As aforementioned, the radiation treatment results in a surface modification of the irradiated reinforcement fibers that includes a rough surface, or an abraded surface, or a surface with deformations and/or asperities and/or pores, as compared to a smooth surface of non-irradiated reinforcement fibers, i.e., without radiation treatment. It is contemplated that the rough and/or abraded surface, or surface with deformations and/or asperities and/or pores, is more receptive to bonding with asphalt and portland cement concrete, and grout compositions. The surface modification or deformation is evident from mere visual inspection of the fiber surface. However, in certain embodiments, the radiation treatment also penetrates or is absorbed below or beneath the surface of the fiber.

In accordance with certain embodiments, the radiation-treated reinforcement fibers of the invention are introduced during preparation of concrete, e.g., in a concrete mixture or blend, and prior to the concrete being field placed and set. It is suitable for the radiation-treated reinforcement fibers to be introduced into a concrete mixture during various steps, and at a variety of locations in the manufacture process. For example, the treated reinforcement fibers are added in a concrete mixing machine or associated machinery, or in a hopper, or in a transportation vehicle, or after discharge from the mixing machine or associated machinery, or the hopper or the transportation vehicle. The radiation-treated reinforcement fibers are added at these various steps in the process provided sufficient mixing occurs to adequately incorporate the radiation-treated reinforcement fibers into the concrete mixture or blend.

In addition to the radiation-treated reinforcement fibers, compounds used in producing asphalt and portland cement concrete include, but are not limited to, fine and/or coarse aggregate, such as but not limited to sand and rock, and a binder that holds together the aggregate. The binder is often referred to in the art as cement. It is suitable to include other additives in the asphalt and portland cement concrete material (for example, in the concrete mixing machine), such as, for example, lime powder. The process of manufacturing asphalt and portland cement concrete includes a batch or continuous process. In the batch process, the treated reinforcement fibers are added to the mixing chamber, having mixing blades, of the concrete mixing machine prior to introducing aggregate and liquid cement. In the continuous process, wherein a drum mixer is used, treated reinforcement fibers are added to the process at any time prior to the introduction of liquid cement. The manufacture of asphalt cement concrete consists of a thermal process, and therefore, includes heating the ingredients, such as in the chamber of the concrete mixing machine. The temperature of the concrete varies and includes those temperatures typically used in commercially-operated concrete manufacturing facilities.

In certain embodiments, the temperature is within a range of about 212° F. to 375° F., or higher than 700° F.

The radiation-treated reinforcement fibers are added to the asphalt and portland cement concrete mixtures in varying amounts. Typically, the amount added is such that desired properties of the concrete are achieved. In certain embodiments, the amount of radiation-treated reinforcement fibers added to the asphalt and portland cement concrete mixtures is such that the radiation-treated reinforcement fibers constitute at least 10.0 percent or greater by volume per ton of concrete. In certain embodiments, the amount of radiation-treated reinforcement fibers is in a range from about 0.0001 percent to about 5.0 percent by volume per ton of the concrete.

The radiation-treated reinforcement fibers are incorporated into the manufacture of various asphalt and portland cement concrete building materials and products used for building or construction, such as, for example, structural pavements, airport runways and tarmacs, bridge deck overlays, floors, and pre-cast concrete products. The treated reinforcement fibers are also used for repair, rehabilitation, retrofit, and renovation of existing products or structures, such as, for example, in overlays, and repairs of airport pavements, bridge decks, parking areas, roadways, and the like, including patching and filling potholes.

In addition to providing reinforcement, incorporation of the radiation-treated reinforcement fibers in, for example, cast asphalt and portland cement concrete, modifies the cracking mechanism and reduces the propagation of microcracking caused by shrinkage. Furthermore, the radiation-treated reinforcement fibers carry a load across the crack and as a result, there is at least one change in the material properties of the asphalt and portland cement concrete, such as toughness, residual load carrying ability after the first crack, and impact resistance. Moreover, the radiation-treated reinforcement fibers produce asphalt and portland cement concrete having improved strength compared to concrete using non-radiation-treated reinforcement fibers, such that the asphalt and portland cement concrete containing the radiation-treated reinforcement fibers are suitable for locations where placed and set asphalt and portland cement concrete experience both high and low temperatures, and areas subjected to heavy loadings (e.g., high traffic areas) and heavy concentrations of truck traffic, as well as many other uses.

Grout compositions include a combination of water and dry grout material, such as, but not limited to, cement, clay, e.g., bentonite, and mixtures thereof, as well as optional additives. Grout compositions include dry blends. Water is added (e.g., on-site at the time of grout placement) to the dry blends to form liquid mixtures.

The reinforcement fibers are composed of material that provides for suspension of the reinforcement fibers in a liquid grout composition. In certain embodiments, wherein the reinforcement fibers are added at the time that the dry grout composition is combined with water, it has been found that the length of the fiber is not necessarily critical. The length of the fibers vary and in certain embodiments, when combining fibers, dry grout composition and water to form a liquid grout material, the fibers have a mean length of up to about 0.5 inch. However, when pre-blending the fibers in the dry blend grout composition, the length of the fibers is pre-selected to improve or enhance mixing and dispersion of the individual fibers throughout the grout composition. As used herein "pre-blended" refers to combining the reinforcement fibers with the dry grout composition prior to packaging (and prior to the addition of water). Pre-blended dry grout compositions include the dry grout material, e.g., ingredients, and the reinforcement fibers that are held in a container, such as a sack or bag. Non-pre-blended dry grout composition includes only the dry grout material/ingredients, e.g., in a sack or bag, without the reinforcement fibers, and the fibers are subsequently added when the dry grout package is opened and combined with water, e.g., on-site. In the pre-blended embodiments, wherein the reinforcement fibers are mixed with the dry grout composition, packaged and then the contents of the package combined with water (e.g., on-site at the time of grout placement), it has been found that there are one or more advantages, such as mixing and dispersion, associated with using fibers that have a short length.

In certain embodiments, the components of the grout are combined using a bulk mixer or the like.

The radiation-treated reinforcement fiber-containing grout compositions of the invention exhibit one or more of the following benefits:

(i) The radiation-treated reinforcement fibers mix well in both wet grout slurry mixes (non-pre-blended), and in dry-powder grout mixes (pre-blended/dry blended) where water is subsequently added during placement;

(ii) The radiation-treated reinforcement fibers allow slurry-liquid grout compositions to remain flowable without causing premature coagulation or clogging during injection of the compositions into voids or cavities;

(iii) In flow, the radiation-treated reinforcement fibers contribute to the flow of fluid into tight fissures and cracks thereby allowing the liquid grout composition to flow only where needed and thus, reducing grout leakage or loss and the expense associated therewith; and (iv) The radiation-treated reinforcement fibers remain suspended in the liquid grout slurry, without floating on or sinking in the liquid medium.

Suitable grout compositions for use in the invention include, but are not limited to, cement-based grouts, chemical-based grouts and mixtures or combinations thereof. Further, these grout compositions include an optional additive, such as but not limited to polymer, to achieve desired properties and characteristics. Non-limiting examples of suitable grout compositions include bentonite grout compositions which may be used in various applications such as grouting horizontal heat loop bores, plugging abandon wells, grouting water wells, and building slurry walls to prevent ground water movement in permeable earth. Bentonite grout compositions, like other grout compositions, are packaged in sacks and therefore, reinforcement fibers are easily blended therewith.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Examples

The objective of the following examples was to measure the effect of gamma ray irradiation of macro polymeric fibers on the mechanical properties, bonding characteristics, and performance of the polymeric fibers for use in concrete. A polypropylene fiber blend consisting of copolymer monofilaments was obtained from Forta Corporation. The fibers were supplied in a bundle, each consisting of 15-17, e.g., an average of 16 yarns per single bundle. Due to the fibrillated nature of the Forta polypropylene fiber blend, the calculation of diameter of a single yarn was not possible with a normal vernier caliper measurement and therefore, an area measuring approach was used to obtain an approximate effective diameter of a single yarn of fiber. The fibers were exposed to three different doses of ionizing irradiation (i.e., gamma radiation) ranging from 5 to 70 kGy. The tensile, interface and performance in a mortar of the irradiated fibers were measured. Uniaxial tensile tests were performed on the irradiated fibers to evaluate fiber strength and failure pattern. SEM tests were conducted to study the surface characteristic and effect of different radiation dose on the polymeric fiber. The interaction of the irradiated fiber with a cement composite was studied by a series of quasi-static pullout tests for a specific embedded length. Flexural tests were also carried out for different doses of irradiated fibers. An average increase of 13% in the stiffness of the fiber was observed for 5 kGy of radiation. The flexural tests showed an average increase of 181% in the $R_{eq3}$ value, and 102% in the toughness of the fibers was observed for a dosage of 5 kGy.

Fiber-reinforced concrete (FRC) beams were prepared using the Forta fibers, and tested. All the samples were cured under identical conditions in a curing room, maintained in a controlled environment of 73° F. and 100% relative humidity until the day of testing. Fiber pullout, as well as four-point bending, tests were performed on the beams cast after 28 days of conventional curing. Tensile tests were conducted on samples subjected to irradiation doses of 5, 35, and 70 kGy. A total of 70 samples were tested, and effective properties of fibers were characterized in accordance to the radiation energy exposed. A Gammacell 220 self-shielded irradiator with the Co-60 source was used to irradiate the fibers. Dose rate for the fiber was about 3.5 Gy/min (350 rad/min).

Calculation of Area for Determining Fiber Diameter

Two methods were used for the calculation of area: (1) mass and density approach, and (2) SEM test and image analysis approach.

Mass and Density Approach

In this method, 100 mm of single yarn was weighted and using the material data specific gravity provided by the manufacturer (Forta Corp.), the volume, area, and the diameter of the yarn was reverse-calculated. The assumed specific gravity of the polypropylene fiber was 0.9. Table 1 shows the specimen weight and effective diameter for the single yarn. This gives an approximate estimation of the actual diameter. Variation in the measurements was likely due to varied fibrillated filament in a single yarn of fiber. The average diameter for a single yarn was 0.53 mm with a standard deviation of 0.03. Similarly for two yarns the estimated diameter was 0.74 mm with a standard deviation of 0.05.

TABLE 1

Weight approach effective diameter calculation

| Length (L) (mm) | Yarn Weight (W) (g) | Area(A) (mm$^2$) | Diameter (D) (mm) |
|---|---|---|---|
| 100 | 19.8 | 0.22 | 0.53 |
| 100 | 17.5 | 0.19 | 0.50 |

TABLE 1-continued

Weight approach effective diameter calculation

| Length (L) (mm) | Yarn Weight (W) (g) | Area(A) (mm$^2$) | Diameter (D) (mm) |
|---|---|---|---|
| 100 | 23.2 | 0.26 | 0.57 |
| 100 | 18.1 | 0.20 | 0.51 |
| Average | | | 0.53 |
| Std. dev | | | 0.03 |

Scanning Electron Image (SEM) Analysis

A more detailed study of the cross-sectional dimension of fibers using SEM image analysis was conducted for three replicated samples. Image J software was used to calculate the area of fiber from the image of the cross-section. Multiple measurements were taken for the images obtained by SEM. The results of the image analysis is tabulated in Table 2. Using the area measurement, an effective diameter of the fiber was estimated. The average effective diameter was calculated as 0.52+/−0.02 mm (attributed to the fibrillated nature of the fiber).

TABLE 2

SEM image analysis results.

| Sample ID | Replicate Sample | Area (mm2) | D (mm) |
|---|---|---|---|
| 1 | 1 | 0.239 | 0.552 |
|   | 2 | 0.217 | 0.526 |
|   | 3 | 0.223 | 0.533 |
| 2 | 1 | 0.198 | 0.502 |
|   | 2 | 0.189 | 0.491 |
|   | 3 | 0.186 | 0.487 |
| Average | | 0.209 | 0.515 |
| Std. dev | | 0.021 | 0.026 |

Experimental Program

A Direct Tension test was performed on the fibers. A section of the roving was obtained from the spool, after being subjected to irradiation. Twisted roving was separated into 15 to 17 individual yarns as a standard testing unit. To maintain the reproducibility of sample extraction, from a bundle, an average number of 2 yarns was used for the fiber Tension test. This resulted in a homogeneous sample collection.

The tests were conducted in a MTS 810 system servo hydraulic system. The variables were the level of irradiation used, effect of fiber length, and the rates of loading. Samples were tested on two separate test machines in order to differentiate between the accuracy of testing devices and clamping methods. The tension tests were conducted and recorded in the following phases:
1. Using the same gauge length but with variable displacement rates;
2. Using the same displacement rate with variable gauge lengths; and
3. Effect of radiation intensities at a given gauge length and displacement rate.

A universal joint was connected to a testing frame to allow rotation of the grip and to remove any potential twisting or bending. The universal joint also contributed to the alignment of yarn during the test. Since the microfiber had a smooth surface finish, samples encountered significant slip on the application of tensile load. To reduce the slippage, arrest the slip, and capture true stress strain response of the sample, frictional grips were used. The fiber was fed into and wrapped around the mandrel on the upper grip. After the cross head was moved to the gage length position, the fiber was aligned and wrapped along the bottom grip mandrel and then secured in the mandrel using frictional wedge screws. The extensometer was mounted using rubber bands.

TABLE 3

Summary of uniaxial fiber tension test samples.

| No. | Type | Gage Length mm (in) | Stroke Displacement mm/min (in/min) | # Replicates | Total Samples | Test Date |
|---|---|---|---|---|---|---|
| 1 | Non-irradiated | 150 (6) | 2.54 (0.1) | 5 | 7 | Jul. 10, 2017 |
| 2 | Non-irradiated | 150 (6) | 12.7 (0.5) | 5 | 7 | Jul. 28, 2017 |
| 3 | Non-irradiated | 150 (6) | 63.5 (2.5) | 5 | 7 | Jul. 28, 2017 |
| 4 | Non-irradiated | 200 (8) | 12.7 (0.5) | 7 | 8 | Jul. 13, 2017 |
| 5 | Non-irradiated | 300 (12) | 12.7 (0.5) | 8 | 9 | Jul. 13, 2017 |
| 6 | Irradiated (5 kGy) | 150 (6) | 12.7 (0.5) | 4 | 8 | Nov. 8, 2017 |
| 7 | Irradiated (35 kGy) | 150 (6) | 12.7 (0.5) | 6 | 8 | Jul. 28, 2017 |
| 8 | Irradiated (70 kGy) | 150 (6) | 12.7 (0.5) | 6 | 8 | Oct. 13, 2017 |

Two different measures of deformation consisting of the extensometer recording, as well as the stroke response of the equipment, were measured and recorded. The gage length of the extensometer was used in the calculation of the fiber stiffness to avoid spurious deformations that took place due to fiber slip gauge at the support. Tests were conducted using stroke control at three different rates of 0.1 in./min, 0.5 in./min and 2.5 in./min.

Test Results

The orientation of the yarn prior to the test was due to the weight of the extensometer, which as soon as the load was applied returned to the straight position. A free tilt of the hinge fixture was due to the universal joint. The sample was loaded to failure and in the vicinity of the peak load, signs of crazing were evident. The strength was reached after significant plastic deformation. Average values of engineering strain were in the range of 25 to 30%.

The load-displacement responses from the actuator and the extensometer were processed and stress-strain responses obtained. In a typical tensile test result, the load increases linearly and drops immediately after the failure. Strain measures were recorded from the 2-inch extensometer and stress was recorded from the 300 lb Instron load cell. The data recorded from the actuator were in accordance with the extensometer readings.

The test parameters showed that the effect of different rates on the sample caused significant change in the response of the sample. Higher stiffness was observed for a high rate (63.5 mm/min) as compared to that for a low rate (2.5 min/min). The effect of different gauge length on the peak strength of the fiber was negligible.

Table 4 shows the results of fiber properties as a function of displacement rates. The average tensile strength of the fiber increased from 389 MPa to 423 MPa as the displacement rate increased from 2.54 mm/min to 63.5 mm/min. This may have been attributed to the viscoelastic property of the fiber. Average stiffness increased from 0.7 to 1.6 kN/m as the loading rate increased from 2.5 mm/min to a higher rate of 63.5 mm/min. Conversely, the average strain value decreased from 32% to 24% for a higher rate of 63.5 mm/min compared to the lower rate of 2.5 mm/min. Average toughness increased from 1.1 kN-m to 1.5 kN-m for the higher rate of 63.5 mm/min, and high tensile strength at this higher rate was an important factor for the increase. At the lower rate of 2.5 min/min, the average tensile strength of the sample was 1.1 kN-m. This data would be useful in the simulation and modeling of the dynamic response and high-speed performance of the FRC with polymeric fibers.

TABLE 4

Fiber Tension Test results at different extension rates.

| Gauge Length mm (inches) | Stroke Rate mm/min (in/min) | Sample | Max Force (N) | Tensile Strength (MPa) | Strain (%) | Stiffness (kN/m) | Toughness (kN-m) |
|---|---|---|---|---|---|---|---|
| 152.4 (6) | 63.5 (2.5) | T1 | 161 | 374.5 | 26 | 0.74 | 1.25 |
| | | T2 | 191 | 444.3 | 23 | 1.52 | 2.14 |
| | | T3 | 187 | 435.0 | 25 | 2.35 | 1.26 |
| | | T4 | 188.5 | 438.5 | 25 | 1.66 | 1.26 |
| | | Average | 181.9 | 423.1 | 24.8 | 1.6 | 1.5 |
| | | Std. | 14 | 32.60 | 1.25 | 0.6 | 0.4 |
| | 12.7 (0.5) | T1 | 166 | 386.2 | 23 | 1.00 | 0.84 |
| | | T2 | 167 | 388.5 | 22 | 0.86 | 0.81 |
| | | T3 | 168 | 390.8 | 23 | 0.75 | 0.84 |
| | | T4 | 150.6 | 350.3 | 27 | 0.68 | 0.92 |
| | | Average | 162.9 | 378.95 | 23.8 | 0.8 | 0.9 |
| | | Std. | 8.2 | 19.2 | 2.2 | 0.13 | 0.04 |
| | 2.54 (0.1) | T1 | 165 | 383.8 | 36 | 0.51 | 1.00 |
| | | T2 | 150 | 348.9 | 34 | 0.46 | 1.35 |
| | | T3 | 144 | 335.0 | 27 | 0.46 | 0.80 |
| | | Average | 153 | 355.9 | 32.3 | 0.5 | 1.1 |
| | | Std. | 10.8 | 25.1 | 4.7 | 0.02 | 0.27 |
| | | Average | 167.1 | 388.7 | 26.4 | 0.7 | 1.13 |
| | | Std. Dev | 16 | 37.3 | 4.5 | 0.18 | 0.39 |

Table 5 shows results of fiber properties as a function of gauge length. The change in the average tensile strength was minimal when tested as a function of length. The range varied from 379 MPa to 369 MPa as the gauge length varied from 150 mm to 300 mm. Similarly, very small changes in the strain and toughness values were obtained, when varied as a function of length. The range for the strain was between 23 to 25%, and the range for the toughness was from 0.85 to 0.9 kN-m. However, the stiffness of the sample decreased as the gauge length increased. Stiffness decreased from 0.8 kN/m to 0.5 kN/m as the gauge length increased from 150 mm to 300 mm.

TABLE 5

Fiber Tension Test results at different gauge length.

| Gauge Length mm (inches) | Stroke Rate (mm/min) (in/min) | Sample | Max Force (N) | Tensile Strength (MPa) | Strain (%) | Stiffness (kN/m) | Toughness (kN-m) |
|---|---|---|---|---|---|---|---|
| 150 (6) | 12.7 (0.5) | T1 | 166 | 386.2 | 23 | 1.00 | 0.84 |
| | | T2 | 167 | 388.5 | 22 | 0.86 | 0.81 |
| | | T3 | 168 | 390.8 | 23 | 0.75 | 0.84 |
| | | T4 | 150.6 | 350.3 | 27 | 0.68 | 0.92 |
| | | Average | 162.9 | 379.0 | 23.8 | 0.8 | 0.9 |
| | | Std. Dev | 8.2 | 16.6 | 2.2 | 0.13 | 0.04 |
| 200 (8) | | T1 | 159 | 369.9 | 24 | 0.56 | 0.83 |
| | | T2 | 155 | 360.6 | 27 | 0.54 | 1.16 |
| | | T3 | 152 | 353.6 | 25 | 0.56 | 0.68 |
| | | T4 | 156 | 362.9 | 26 | 0.60 | 0.67 |
| | | Average | 155 | 361.8 | 25.3 | 0.6 | 0.9 |
| | | Std. Dev | 3.5 | 5.8 | 1.5 | 0.01 | 0.23 |
| 300 (12) | | T1 | 171 | 397.8 | 24 | 0.53 | 0.6 |
| | | T2 | 155 | 360.6 | 23 | 0.51 | 0.94 |
| | | T3 | 156 | 362.9 | 24 | 0.51 | 0.95 |
| | | T4 | 153 | 355.9 | 25 | 0.49 | 1.07 |
| | | Average | 160 | 369.3 | 23.7 | 0.5 | 0.8 |
| | | Std. Dev | 8.9 | 16.6 | 0.5 | 0.01 | .02 |
| | | Average | 159.1 | 370.0 | 24.4 | 0.63 | 0.86 |
| | | Std. Dev | 7 | 16.4 | 1.62 | 0.161 | 0.164 |

Table 6 shows the results of fiber properties as a function of different irradiation levels. The average tensile strength of the fiber decreased as the radiation level or dose increased. Average tensile strength decreased from 413 MPa to 42.5 MPa as the radiation increased from 5 kGy to 70 kGy. Similarly, strain decreased from 24% to 4% as the radiation increased from 5 kGy to 70 kGy. Average stiffness increased from 0.8 kN/m to 0.9 kN/m for 5 kGy radiation sample as compared to the control sample. But for 35 kGy radiation, stiffness decreased to 0.42 kN/m. Negligible stiffness was observed for the 70 kGy radiation sample, which also had a high decrease in strength. For the 5 kGy sample, the average stiffness increased in comparison to control sample without sacrificing the strength parameter.

TABLE 6

Effect of different irradiation levels on the tensile properties of samples. Disp. Rate: 0.5 in./min, Gauge length: 6 inches.

| Radiation Dose | Sample | Max Force (N) | Tensile Strength (MPa) | Strain (%) | Stiffness (kN/m) | Toughness (kN-m) |
|---|---|---|---|---|---|---|
| 5 kGy | T1 | 167.3 | 389.2 | 26 | 0.78 | 0.37 |
| | T2 | 167.1 | 388.7 | 23 | 0.98 | 0.37 |
| | T3 | 170.4 | 396.4 | 22 | 0.87 | 0.34 |
| | T4 | 205.5 | 478.1 | 26 | 0.94 | 0.46 |
| | Average | 177.6 | 413.1 | 24.3 | 0.89 | 0.39 |
| | Std. Dev | 18.7 | 43.5 | 2.08 | 0.08 | 0.05 |
| 35 kGy | T1 | 98 | 228.0 | 16 | 0.72 | 0.42 |
| | T2 | 91 | 211.7 | 15 | 0.56 | 0.42 |
| | T3 | 104 | 241.9 | 15 | 0.67 | 0.64 |
| | T4 | 90 | 209.4 | 14 | 0.7 | 0.37 |
| | T5 | 82 | 190.8 | 16 | 0.65 | 0.27 |
| | T6 | 97 | 225.7 | 15 | 0.79 | 0.44 |
| | Average | 93.7 | 217.9 | 15.1 | 0.68 | 0.42 |
| | Std. Dev | 7.7 | 17.8 | 0.745 | 0.08 | 0.12 |
| 70 kGy | T1 | 17.2 | 40.0 | 3.1 | Negligible | 0.01 |
| | T2 | 13.2 | 30.7 | 3.3 | | 0.012 |
| | T3 | 21 | 48.9 | 3.5 | | 0.027 |
| | T4 | 21.7 | 50.5 | 4 | | 0.014 |
| | Average | 18.8 | 42.5 | 3.4 | | 0.016 |
| | Std. Dev | 6 | 9.1 | 0.4 | | 0.008 |

Microstructure Examination Using SEM (Scanning Electron Microscope)

A XL30 ESEM-FEG high resolution electron imaging instrument was used to evaluate the microstructure of irradiated fibers. The equipment was operated at a pressure of 10 Torr. The resolution of the SEM was 3 nm. The XL30 ESEM-FEG employed the stable, high brightness Schottky Field Emission Source for observation performance of potentially problematic samples for conventional high vacuum SEMs. Typical morphological characterization required that the fiber be conductive. Thus, samples were coated with carbon in a vacuum sputtering chamber and then analyzed by SEM. This approach allowed for good image distribution of the samples. The SEM showed a smooth fibrillated surface of a control single fiber filament at different magnifications. The surface morphology of fiber when irradiated with 5 kGy of radiation showed a disturbance on the surface of the fiber at a very low magnification of 65×. At higher magnification, only the surface of the fibrillated filament was observed as being affected by the radiation, and no type of damage or degradation was observed at this level of radiation. The surface characterization of the fiber when irradiated with 35 kGy of radiation was observed from the SEM images at lower magnification of 65× as having very little degradation of the fiber. However, as the magnification was increased to 1000× and 2500×, there was clearly observed degradation on the surface of the fiber due to the radiation dose. For the surface characterization of the fiber radiated with 70 kGy of radiation, there was observed degradation of the fiber at the very low magnification. In certain instances, micro fiber filaments were being damaged by the radiation energy, thus, lowering the tensile strength.

Effect of Radiation Level on the Fiber Performance

After conducting fiber tensile tests at multiple radiation levels for a specific gauge length and rate under quasistatic loading conditions, the stiffness, strain capacity and strength parameters of the polypropylene fiber were measured. The strength data decreased with increased radiation. When irradiated with 5 kGy of radiation, the average tensile strength increased from 379 MPa (control) to 413 MPa; an average improvement of 9% in the tensile strength was reported for this radiation dose. There was an increase of 11% in the stiffness value for 5 kGy of radiation, where the stiffness values increased from 0.8 kN/m (control) to 0.9 kN/m. When irradiated with 35 kGy and 70 kGy, the tensile strength decreased from 379 MPa (control) to 217 MPa which represented a 38% decrease in the tensile strength, and 42 MPa which was about a 90% decrease in the tensile strength of the polypropylene sample when compared with the control sample, respectively.

The observed strength and stiffness reduction could have been attributed to the damage in the fiber caused by the radiation. In the SEM images of 35 kGy and 70 kGy samples, damaged filaments in the yarn could be seen and the extent of damage increased as the radiation dose increased. At 5 kGy of radiation, there were disturbances created on the surface of the sample but no damage of the sample morphology was observed.

Fiber Pullout Experiments

Introduction and Objective:

When a composite section is loaded, a portion of the load is transferred from the fiber to the matrix, or vice versa along their interfacial region. Because of the difference in stiffness between the fiber and matrix, shear stresses develop along the interface resulting in force transfer between the two phases. As this stress is increased due to higher load levels, de-bonding occurs which leads to separation and formation of a displacement discontinuity referred to as slip. The stiffness and frictional resistance (sliding) of the fiber-matrix interface results in load redistribution, toughening and energy dissipation as a measure of the effectiveness of the bond parameters.

The load carrying capacity of cement-based composites depends on the performance of three components: fiber, matrix and interface. Cracking of the brittle matrix occurs when it is subjected to stresses greater than its tensile strength. The occurrence of cracking is unavoidable, however, crack opening is controllable by means of a force transfer mechanism. A well-developed bond between matrix and fiber increases force transfer between the two phases. The net result is that the structural stiffness slowly or gradually degrades, as opposed to a sudden loss of strength. On the contrary, poor bonding and discontinuous fiber reinforcement result in fewer larger cracks localized in a narrow region. The stiffness degenerates more rapidly and crack widths soon become visible. Proper modeling of load transfer between the two materials, e.g., fiber and cement, is a crucial tool in the development of high performance discrete fiber and textile reinforced cement composites.

The fiber and matrix interface was characterized in terms of adhesion and frictional bond properties as affected by the irradiation. Changes that take place at the interfacial zone once the fiber is subjected to irradiation were assessed as follows:
1. Preparation of fiber pullout samples using different fiber and matrix characteristics;
2. Experimental testing of fiber pullout tests and obtaining pullout force slip response of fibers embedded in a cementitious matrix, and using the test results to obtain the load-slip response of a single fiber embedded in cement matrix and its model fitting with a theoretical approach to reverse calculate the material properties;
3. Obtaining the stiffness and interfacial zone bond parameters of the fiber-cement matrix; and
4. Comparison of the irradiated and non-irradiated fiber samples, and their interfacial characteristics.

Sample Preparation Procedure

All specimens were cast in a Schedule 40 PVC pipe of 12.7 mm diameter, 50.8 mm height with varying embedded lengths of fibers. The specimens were set inside a recessed hole on a wooden mold with fibers inserted from the bottom and sample cast from the top. The supporting mold held the fiber at the required embedded length as the paste mixture was poured. A stainless screw was placed in the fresh paste to cover the surface and provide sufficient anchorage to transfer the load between hardened past and the permanent mold.

The step-by-step procedure for sample preparation was as follows:
1. Clean the wooden mold and orifices before rowing the fiber through the mold;
2. Bring the fiber to the desired embedded length and secure the loose end by means of tape;
3. Once all the fibers were ready, place the PVC molds around the fibers;
4. Pour the matrix in the PVC mold using a syringe, and cover the cast sample with a threaded bolt having a rounded head to anchor the matrix on the top edge; and
5. Remove the tape from the other end and remove the sample from the wooden mold after 24 hours of casting, and cure.

TABLE 7

Mix formulation of matrix

| Mix ID | Mix proportions | Curing (days) | Fiber Types | Fiber Embedded Length (mm) |
|---|---|---|---|---|
| A | 1C:0.4W | 7, 28 | Forta | 19.0 |
| B | 1C:0.15 FA 0.4W | 7, 28 | Forta | 19.0 |

Table 7 represents two matrix formulations that were used. Mix A consisted of Portland cement (C) and water (W) at W/C of 0.4, and Mix B consisted of Portland cement (C), water (W) and 15% flyash (FA).

Experimental Program

The test set up consisted of attaching the fiber specimen while inside the mold to one end of the testing machine using a threaded section of the mold. The other end of the free fiber length was secured in a fiber gripping mechanism constructed of a hole with several set screws. This grip was used to secure the inserted loose fiber in a hole by means of three screws applying pressure to a half cylindrical copper hollow tube that was inserted along the length of the fiber. A thin copper sheet was used to apply a uniform pressure along the length of the fiber in order to prevent it from failing in the grip. Tightening of the set screws resulted in distributing a grip pressure evenly on the face of the fiber. The bottom of the fiber embedment grip was connected to a stroke actuator using a connecting pin. A 300-lb. load cell was used to record the pullout force. Tests were conducted in a MTS 810 system servo hydraulic system.

An extensometer with a gage length of 1" and range of 0.15" was used to record the slip between the matrix and the fiber end. The extensometer was mounted using rubber bands to the frame and the sample. The top arm was in contact with the core and the bottom arm was placed on the fiber grip, thus measuring the displacement as the slip of fiber from the core. The fiber was completely inserted into the hole, resulting in a negligible free length between the sample and fiber grip such that a true load slip curve was obtained. There was no correction required for the free length elongation. A displacement control test at the rate of 0.1 in/min was used on the pullout samples.

Test Results:

Pullout tests were carried out on an MTS 810 at three different static crosshead rates of 0.1 in/min. The experiment was conducted for at least three replicate samples for every group. Samples that were disturbed while setting up or misaligned tests were discarded. The testing procedures involved the following steps: the PVC core was mounted in the threaded cap and tightened to avoid any slip; the free fiber was then pulled through the fiber grip and secured by means of the set screws as mentioned above; the set up was then aligned and connected to the actuator; and the extensometer was attached on a PVC sleeve around the core to measure the local slip of the fiber. There were significant spurious deformations when the stroke actuator response was compared with the extensometer slip, as the extensometer provided a more accurate measurement of the stiffness of the bond as compared to stroke displacement.

The extensometer response was used to measure the initial stiffness, while the total slip was measured from the stroke response. Due to the small range of the extensometer, the test was paused and the extensometer removed before the test proceeded to the end of the entire fiber pullout range. This caused a small kink in the load slip response due to fiber relaxation, which was accounted for in processing the data. A comparison of the response measured by the stroke and the extensometer for a typical specimen was conducted. The error in the measurement of the stiffness from the stroke signal was significantly high.

Test results were used to determine the fiber-bond stiffness, the maximum load, initial elastic stiffness of the interface, the slip at maximum load, the energy dissipated due to pullout samples.

Results and Discussion

Due to the nature of the fiber interface, there was a wide range of distribution among the various fibers. The fiber in the presence of two different mixes was used to observe the response. Thus, at least three sets of results from each fiber category were compared. The results from the 7-day and 28-day tests included Mix A and Mix B. The average maximum load required to break the elastic bond or shear in elastic zone was greater for Mix B (with fly ash) as compared to Mix A (without fly ash). The use of fly ash resulted in densification of the interface transition zone, and a more homogeneous response of the interface. Due to the short age of curing for 7 days, the strength of the plain cement matrix was higher than the fly ash blended mixtures. After 28 days, the response of the Mix B was significantly higher in the post peak range as indicated by a quasi-plastic response in the post de-bonding zone. This indicated a better performance of the bond parameters in mixtures that included fly ash.

TABLE 8

Strength parameters of the tested samples

| Curing (Days) | Mix Type | Rep. ID | Max Load, N | Stiffness, N/mm | Toughness N · mm |
|---|---|---|---|---|---|
| 7 | A | P1 | 11.0 | | |
| 7 | A | P2 | 26.6 | 70.09 | 304.2 |
| 7 | A | P3 | 12.2 | 41.13 | 113 |
| 7 | A | P4 | 24.6 | 15.25 | 326 |
| 7 | A | P5 | 21.8 | 30.01 | 310 |
| Average | | | 19.2 | | |
| Std. dev | | | 7.2 | | |
| 7 | B | P1 | 22.6 | 27 | 347.5 |
| 7 | B | P2 | 14.8 | 24.38 | 178.5 |
| 7 | B | P3 | 19.5 | 40.77 | 158.6 |
| 7 | B | P4 | 20.6 | 34.07 | 164.6 |
| Average | | | 19.4 | | |
| Std. dev | | | 3.3 | | |
| 28 | A | P1 | 26.9 | 72.34 | 349.2 |
| 28 | A | P2 | 26.8 | 97.42 | 202.1 |
| 28 | A | P3 | 23.0 | 57.31 | 200.4 |
| 28 | A | P4 | 14.6 | 52.35 | 219.8 |
| 28 | A | P5 | 18.4 | 48.64 | 156.3 |
| Average | | | 21.9 | | |
| Std. dev | | | 5.4 | | |
| 28 | B | P1 | 16.3 | 42.28 | 78 |
| 28 | B | P2 | 23.9 | 94.69 | 145.3 |
| 28 | B | P3 | 35.8 | 46.24 | 178.8 |
| 28 | B | P4 | 19.6 | 55.15 | 216.9 |
| Average | | | 23.9 | | |
| Std. dev | | | 8.5 | | |

Table 8 shows the strength parameters obtained after analyzing the pullout results for a control sample. The average maximum load recorded to break the bond was 19.4 N for Mix B and 19.2 N for Mix A at 7 days, and 23.9 N for Mix B and 21.9 N for Mix A at 28 days.

The maximum pullout force for 28 days was more than that of 7 days, for Mix A.

There were different stages of a pullout response for a sample. The first stage was the elastic range where the initial elastic bond between the two phases was measured. The next stage was the initiation of de-bonding. Slow stages of de-bonding took place until the maximum load, which was associated with full de-bonding with $\tau_{max}$ as the average bond strength. The next stage was the frictional sliding of the fiber that was defined using parameter $\tau_{frc}$ and once the fiber was completely de-bonded, it would completely pullout under a dynamic response. Energy required to pull out the embedded length of the fiber from the matrix was measured from the area enclosed in the load-slip response, and could also be used as a measure to characterize fiber-matrix interaction. The load slip response comparison for two different mixtures as a function of age was performed. It was observed that the response of Mix B (with fly ash) was superior to that of Mix A (without fly ash). Also, the effect of curing age on the load-slip response was observed. There was an increase in the peak load and stiffness for the 28 day cured samples as compared to the 7 day cured samples.

Irradiated Fiber Results:

A pullout test was conducted on 5 kGy radiation samples and the load versus slip responses of the samples were obtained. An increase in the stiffness of the pullout sample was observed in mixtures with fibers radiated with a dose of 5 kGy. A minimal increase in the peak load was also observed for the 5 kGy radiation sample when compared to a control sample.

A pullout test was also conducted on 35 kGy and 70 kGy radiation samples. The 70 kGy radiation sample of fibers failed before the interface showed any failure. The results of the 35 kGy radiation samples showed from the load vs slip behavior that fiber failure followed after a very low peak load without any matrix failure. Two inferences were considered: (i) an increase in the maximum shear bond strength caused the failure or (ii) a decrease in the tensile strength of the fiber caused the failure. A similar failure pattern was obtained for 70 kGy samples.

TABLE 9

Strength parameters of the tested samples (5 kGy)

| Curing (Days) | Mix Type | Rep. ID | Max Load A N | Stiffness N/mm | Toughness N-mm |
|---|---|---|---|---|---|
| 7 | A | P1 | 32.6 | 19.28 | 374.1 |
| 7 | A | P2 | 26.48 | 33.6 | 241 |
| 7 | A | P3 | 28.9 | 78.9 | 52.1 |
| Avg. | | | 29.3 | 43.9 | 222.4 |
| Std. dv | | | 3.08 | | |
| 7 | B | P1 | 20.2 | 26.3 | 187.9 |
| 7 | B | P2 | 26.6 | 108.4 | 131.2 |
| 7 | B | P3 | 10.51 | 41.66 | 80.8 |
| Avg. | | | 19.1 | 58.8 | 133.3 |
| Std. dv | | | 8.1 | | |

Flexural Tests on Fiber Reinforced Mortar

Four-Point Bending Tests.

Standard four-point bending tests were performed on six replicate FRC beams manufactured using irradiated fibers. An LVDT was mounted on the back face of the beam to measure the deflection of the beam. The testing procedure used is summarized in Table 10. The complete procedure was divided into three phases based on the mode of control during the test. The beam after failure was observed to include fibers that were able to bridge the crack and maintain the integrity of the beam even after the test has terminated.

TABLE 10

Testing procedure used in the MTS station manager to control the test

| Phase | Control Mode | Loading Rate | Phase Limit |
|---|---|---|---|
| 1 | Load | 37 N/sec | 6700N |
| 2 | Actuator (Deflection) | 5 µm/sec | 5 mm |
| 3 | Actuator (Deflection) | 20 µm/sec | 7.5 mm |

A deflection response was measured using a spring-loaded LVDT mounted at the central proportion of the fiber specimen. The LVDT had a capacity of 7.5 mm, and was used for parameter estimations similar to guidelines required by ASTM 1609 testing standard, such as residual strength and toughness. The geometry of the specimen did not exactly match the ASTM C1609 test geometry, however, similar parameters were reported for comparison purposes. Load-deformation responses of all specimens were recorded via load-deflection curves, which terminated before 3 mm and was equivalent to a deflection limit of L/150.

A very low residual strength was obtained for a control (non-irradiated) sample. When the irradiated fibers were used in the mix, an increase in post peak strength was observed. The increase in the post peak residual strength was greater for the 5 kGy sample as compared to that for the 35 kGy sample. The residual strength of the control sample was in the range of 200 N, and for the 5 kGy and 35 kGy radiation samples was 1000 N and 500 N, respectively. This was indicative of a five-fold increase in the residual strength due to irradiation.

The roughness or the disturbance created by the radiation on the surface of the fiber contributed to an increase in post peak behavior. From the response obtained, a reverse calculation procedure was used to obtain tensile parameters in accordance with the ACI-544-8R guidelines. This provided the effect of radiation on the fiber matrix bond. Residual stress at L/600 increased from 0.7 MPa (control) to 1.3 and 1.2 MPa for the 5 and 35 kGy radiation samples, respectively. A similar increase was observed for toughness as a measure of energy absorption capacity of the test specimen. Toughness increased from 0.69 J (control) to 1.4 J and 1.13 J for the 5 kGy and 35 kGy radiation samples, respectively. The maximum strength is primarily a function of matrix strength and age of curing, and is not significantly relevant to fiber reinforced concrete performance. The mix design and dimension of the beam played an important role in the peak strength of concrete. The post-peak or residual strength was of more concern in analysis for the performance of fiber matrix.

Analysis and Simulation of Data:

Compressive strength of concrete cannot be used directly to address all loading cases, and applications, when tensile response is a major controlling parameter. Therefore, a more suitable approach for sustainable design, structural analysis, and long term service life of fiber reinforced concrete was developed. The contribution of fibers for improving ductility in tensile regions was quantified.

Tension Model for FRC

The tensile stress strain response was obtained from a reverse calculation process from flexure test. The strain softening tensile model was used to simulate the test data. Bilinear stress strain response was obtained for the sample. The tensile response had two stages, before and after peak. Stage 1, e.g., the response until the peak tensile strength, depended on the mix design and dimension of beam, and stage 2 depended primarily on the fiber performance. The response in stage 1 was similar for the control, 5 kGy and 35 kGy samples. However, in stage 2, the response for the 5 kGy sample was superior to that of the control and 35 kGy samples.

The moment carrying capacity after cracking determined for the 5 kGy radiation sample was highest, and the results of the control and 35 kGy samples were low in comparison to 5 kGy radiation sample. There was an increase of 75% in the moment carrying capacity for the 5 kGy radiation sample as compared to the control sample and 35 kGy sample.

Conclusions and Summary

Gamma irradiation was a viable tool for improving the mechanical properties of the Forta fibers. There was an increase in the mechanical properties of the fibers when irradiated with 5 kGy. Radiating the fibers with a 5 kGy dose improved the stiffness by 14% and increased by 6% the average tensile strength of the sample. Conversely, a diminution of 41% and 90% in the tensile strengths was observed when radiated with 35 kGy and 70 kGy, respectively. The pullout response was highly dependent on the mixture design and radiation dose. The control sample exhibited varied responses due to the fibrillated nature of the fiber. Forta fiber exhibited enhance bonding with cement matrix, when an adequate content of fly ash was used. Also, the radiation affected the bond between fiber and cementitious matrix.

The post peak behavioral response of the flexural beam increased when the fibers were irradiated with gamma rays. An increase of 181% and 6% in $R_{e3}$ value for 5 kGy and 35 kGy radiation samples, respectively, was observed in comparison to the control sample. Similarly, an increase of 102% and 64% in toughness at 3 mm was observed for 5 kGy and 35 kGy radiation samples, respectively, in comparison to the control sample.

In Table 11 it is observed that the μ values are in a range of 0.08 to 0.14 for the control sample. After radiation, there was an increase in the performance of the sample as shown from the μ values. For the 5 kGy radiation sample, the μ values range from 0.18 to as high as 0.48 and for the 35 kGy radiation sample, the values of μ decreased to 0.14 to 0.18.

TABLE 11

Back Calculation Parameters

| Radiation Dose | Specimen ID | E (MPa) | $\varepsilon_{cr}$ | α | $\beta_{tu}$ | μ |
|---|---|---|---|---|---|---|
| 0 kGy (Controlled) | B1 | 21000 | 0.000105 | 4 | 320 | 0.14 |
| | B2 | 21000 | 0.00012 | 3 | 400 | 0.08 |
| | B3 | 21000 | 0.0001 | 3 | 250 | 0.13 |
| | B4 | 19000 | 0.0001 | 4 | 300 | 0.13 |
| 5 kGy | B1 | 20000 | 0.0001 | 4 | 400 | 0.18 |
| | B2 | 18500 | 0.0001 | 4 | 400 | 0.21 |
| | B3 | 17500 | 0.0001 | 4 | 400 | 0.24 |
| | B4 | 18500 | 0.0001 | 4 | 350 | 0.31 |
| | B5 | 16500 | 0.000095 | 5 | 350 | 0.48 |
| | B6 | 18000 | 0.000095 | 5 | 350 | 0.28 |
| 35 kGy | B1 | 20000 | 0.0001 | 4 | 400 | 0.18 |
| | B2 | 21000 | 0.000105 | 4 | 320 | 0.14 |
| | B3 | 21000 | 0.000105 | 4 | 300 | 0.17 |
| | B4 | 21000 | 0.00011 | 4 | 300 | 0.15 |
| | B5 | 20000 | 0.0001 | 4 | 300 | 0.18 |

The invention claimed is:

1. A reinforced asphalt or portland cement concrete composition, comprising:
    a plurality of radiation-treated concrete reinforcement fibers, comprising:
        a plurality of concrete reinforcement fibers comprising monofilaments, having a surface, and selected from the group consisting of polymer fibers, aramid fibers, and blends or mixtures thereof; and
        a modification to the surface formed by exposure to electromagnetic energy and/or electron-beam radiation to form a plurality of radiation-modified, concrete reinforcement fibers, the modification selected from the group consisting of deformation, abrasion, roughness, asperity, porosity, and combinations thereof;
    aggregate; and
    binder.

2. The concrete composition of claim 1, wherein the electromagnetic energy comprises gamma rays.

3. The concrete composition of claim 1, wherein the plurality of radiation-treated reinforcement fibers comprises a material selected from the group consisting of aramid, polyolefin, and blends and mixtures thereof.

4. The concrete composition of claim 1, wherein the plurality of radiation-treated reinforcement fibers is incorporated prior to the concrete composition being set or field placed.

* * * * *